United States Patent

[11] 3,607,797

| [72] | Inventors | Louis C. Rubens<br>Midland;<br>Donald H. Clarke, Essexville, both of Mich. |
|---|---|---|
| [21] | Appl. No. | 801,162 |
| [22] | Filed | Feb. 20, 1969 |
| [45] | Patented | Sept. 21, 1971 |
| [73] | Assignee | The Dow Chemical Company<br>Midland, Mich. |

[54] COMPOSITE CELLULAR MATERIAL
4 Claims, No Drawings

[52] U.S. Cl. ........................................................ 260/2.5 AK,
                                                                    260/2.5 B
[51] Int. Cl. ........................................................ C08g 41/04
[50] Field of Search ............................................. 260/2.5
                                                                    AK, 2.5 B

[56] References Cited
UNITED STATES PATENTS

| 2,848,428 | 8/1958 | Rubens | 260/2.5 |
| 3,277,026 | 10/1966 | Newnham et al. | 260/2.5 |
| 3,300,421 | 1/1967 | Merriman et al. | 260/2.5 |

FOREIGN PATENTS

| 762,531 | 7/1967 | Canada | 260/2.5 |
| 975,334 | 11/1964 | Great Britain | |
| 997,332 | 7/1965 | Great Britain | 260/2.5 |
| 997,334 | 7/1965 | Great Britain | 260/2.5 |

OTHER REFERENCES

German Patentanmeldung No. B 29206 IVb/39 b published March 8, 1956 (3 pages).

*Primary Examiner*—Donald E. Czaja
*Assistant Examiner*—Donald J. Barrack
*Attorneys*—Griswold & Burdick and Richard G. Waterman

ABSTRACT: The disclosure concerns composite cellular material comprising foamed styrene polymer bodies dispersed in a polyurethane foam matrix and a method of making the cellular material.

COMPOSITE CELLULAR MATERIAL

This invention concerns composite cellular materials suitable for use as crash padding and cushioning material and pertains to a method of making the foam product.

Canada Pat. No. 762,531 makes cellular materials by a method which comprises forming a dispersion of a thermally expandable solid polymer such as polystrene granules in a liquid mixture of ingredients capable of foaming up to a cellular mass such as a polyurethane formulation and allowing the exothermic urethane reaction to proceed whereby the expandable solid polymer granules are foamed to cellular bodies dispersed throughout the foamed polyurethane matrix. The manufacture of such composite cellular materials employing polyurethane foam recipes and expandable polystyrene particles is rendered difficult because the exothermic reaction varies with the recipe, the proportion and kind of reactants, the catalysts, and with the volume of the reacting materials to name a few of the variables that affect the cellular product obtained. Other variables that have been found to have an action on the character and properties of the final product are the proportion of expandable polystyrene granules employed and the density of the foamed bodies of the polystyrene in the composite cellular product. In the foaming-up of expandable polystyrene granules or beads to form cellular bodies composed of a plurality of individually closed thin-walled cells it is required that the polystyrene beads be heated at temperatures up to, and above the softening point of the polymer in order to expand the polymer, but only a few degrees above its softening point, or for only a very short time at slightly higher temperatures, in order to avoid shrinking or collapse of the expanded cellular bodies. Thus the manufacture of composite foam of the kind described above and by the heretofore known way has the disadvantage of requiring careful and constant supervision and control to produce a desired quality product.

It has now been discovered that composite cellular material, comprising cellular bodies of foamed lightly cross-linked copolymers of monovinyl aromatic compounds and divinyl compounds dispersed throughout a flexible predominantly open-cell polyurethane matrix can readily be prepared by procedure which comprises dispersing the thermally expandable cross-linked styrene polymer particles in a liquid mixture required to form, or capable of forming said flexible open-cell polyarethane foam and allowing the mixture to react, whereby the exothermic heat of the urethane reaction causes the particles of the cross-linked thermally expandable styrene polymer to form foam bodies dispersed throughout the flexible polyurethane matrix.

Our researches have shown that composite cellular materials having particularly useful and advantageous properties and characteristics suitable for use as crash padding and as cushioning material should consist essentially of a flexible cellular matrix having dispersed throughout cellular bodies of rigid or semirigid deformable or crushable material which absorbs energy by reason of its being crushed or deformed, rather than by being compressed with subsequent rebound. Our researches have also shown that cellular bodies of lightly cross-linked copolymers of styrene monomers and divinylbenzene not only are excellent materials to incorporate into liquid polyurethane foam forming recipes to form composite cellular articles, but that the thermally expandable lightly cross-linked copolymers can be readily foamed to bodies of a density between about 0.5 and 5.0, preferably 0.7 to 2.0, pounds per cubic foot of foam, while dispersed throughout an exothermic and foaming-up flexible polyurethane formulation without shrinking or collapse of the expanded styrene copolymer foam bodies. Thus manufacture of the composite cellular materials of the invention, possessing superior energy absorbing characteristics and cushioning properties, can readily be carried out.

The polyurethane foam matrix can be any of the flexible polyether polyol urethane foams having predominantly open cells, i.e., at least 50° and preferably 80° or more open cells, and of densities that may range from about 0.8 to 3.0 pounds per cubic foot of the foam. Such foams are prepared by reaction of a polyisocyanate, e.g., tolylene diisocyanate or polymethylene polyphenyl isocyanate, with a polyether polyol such as the adduct of propylene oxide, or propylene oxide and up to about 20 percent by weight of ethylene oxide of butylene oxide, with an aliphatic polyhydric alcohol having from two to eight hydroxyl groups in the molecule and which adduct has an OH equivalent weight of from 500 to 2000. The polyurethane foam may be obtained either in a one-stage process or by way of a "prepolymer," i.e., an intermediate reaction product of the polyether polyol and the polyisocyanate.

The thermally expandable lightly cross-linked copolymers can be the copolymers of one or more monovinyl aromatic hydrocarbons or nuclear halogenated derivatives thereof and from 0.01 to 0.20, preferably from 0.03 to 0.10, percent by weight of a polyvinyl aromatic compound, e.g., a copolymer of from 99.99 to 99.80 percent by weight of styrene and from 0.01 to 0.20 percent of divinylbenzene which copolymer contains a volatile fluid foaming agent that is a poor solvent for the copolymer and boils at a temperature below 100°. Such expandable copolymers and a method of making the same are described and claimed in U.S. Pat. No. 2,848,428. The expandable copolymer particles can be of sizes from about 8 to 80, preferably from 12 to 60, mesh as determined by U.S. Standard screens.

The relative proportions by volume of the components of the composite cellular material or product can vary from about 40 to 90 percent by volume of the flexible open-cell polyurethane foam matrix and from about 60 to 10 percent by volume of the foamed bodies of the lightly cross-linked styrene copolymer, which foam bodies consist for the most part of individually closed, thin-walled cells. The foam copolymer bodies can have a density of from about 0.5 to 5.0 pounds per cubic foot of foam and are dispersed or distributed throughout the flexible open-cell polyurethane foam matrix.

In practice for the production of composite cellular materials in accordance with the invention, a liquid mixture of the ingredients of a polyurethane foam recipe, including the polyether polyol, water surfactant, catalyst and/or a volatile blowing agent, e.g., pentane, trichlorofluoromethane, or 1,1,2-trichloro-2,2,1-trifluoroethane, if desired, is prepared, to which is added the desired proportion of the thermally expandable lightly cross-linked copolymer granules. Thereafter, the polyisocyanate is added and rapidly mixed with the materials. The resulting mixture can be foamed in any suitable way such as by pouring into a mold, e.g., a paperboard box mold, or onto a moving belt in a trough mold and is allowed to expand or foam to produce the composite cellular product.

The following examples illustrate ways in which the principle of the invention has been applied, but are not to be construed as limiting its scope.

EXAMPLE 1

A. A flexible open-cell polyurethane foam was prepared employing the recipe

| Ingredient | Parts by Weight |
| --- | --- |
| Polyether polyol[a] | 100 |
| Tolylene diisocyanate[b] | 57 |
| Water | 5 |
| Silicone surfactant[c] | 1.4 |
| Stannous octoate | 0.6 |
| Triethylenediamine (33 wt. percent solution in dipropylene glycol) | 2 |

[a] The adduct of propylene oxide with glycerine to form a product having a molecular weight of about 3000.
[b] A commercial product consisting of an 80:20 mixture of the 2,4 2,6 isomers.
[c] "DC-190" silicone fluid consisting of a silicone alkylene oxide copolymer.

The ingredients except the tolylene diisocyanate were mixed in a high speed blender, after which the tolylene diisocyanate was added. Vigorous stirring was continued for 30 seconds. The mixture was poured into a paperboard mold having the dimensions 11×17 inches by 10 inches deep, and was allowed to foam. The material expanded or foamed rapidly to form a bun low density flexible foam having the dimensions 11×11×12.6 inches. After curing for 24 hours at room temperature the foam was found to have a density of 1.33 pounds per cubic foot and 99.7 percent open cells. A test piece of the foam 3×3 inches square by 1 inch thick cut from a center part of the foam bun required a load of 0.26 pound per square inch to compress the foam to 60 of its initial thickness.

B. Another batch of the polyurethane foam was prepared exactly as in part (A). above except that 25 parts of an expandable copolymer of 99.9 percent by weight styrene, 0.05 percent divinylbenzene and 0.05 percent ethylvinylbenzene containing 5.83 percent by weight of isopentane as blowing agent, and which copolymer was in the form of beads of sizes as follows

| U.S. Standard Screen | | Weight % Beads |
|---|---|---|
| Thru 10 | on 12 | 17.0 |
| | on 16 | 15.5 |
| | on 30 | 34.6 |
| | on 40 | 8.3 |
| | on 50 | 5.3 |
| Thru 50 | | 19.3 |
| | | 100.0 | were added to the mixture before adding the diisocyanate. The mixture was poured into an 11×17 inch rectangular paperbox mold and allowed to foam. It was cured for 24 hours at room temperature. The foam bun had the dimensions 11×n ×12.1 inches. The composite foam or product had a density of 1.61 pounds per cubic foot. A load of 1.12 pounds per square inch was required to compress the foam to 60% of its initial thickness.

C. Another batch of foam was prepared as in part (B). above except that 50 parts of the expandable copolymer beads were mixed with the materials. The foam bun had the dimensions 11 ×17×12.4 inches and a density of 1.77 pounds per cubic foot. A load of 5.5 pounds per square inch was required to compress the foam to 60% of its initial thickness.

EXAMPLE 2

A. A flexible open-cell polyurethane foam was prepared employing the recipe:

| Ingredients | Parts by Weight |
|---|---|
| Polyether triol (3000 M.W.) | 500 |
| Tolylene Diisocyanate | 285 |
| Water | 25 |
| Silicone Surfactant (DC-190) | 7 |
| Stannous octoate | 3 |
| Triethylenediamine (33% solution in dipropylene glycol) | 10 |

The materials except the tolylene diisocyanate were mixed together. Thereafter the tolylene diisocyanate was added, The mixture was stirred in a high speed blender for 30 seconds, then was poured into an 11×17 inch rectangular paperboard box mold 10 inches deep and allowed to foam and stand at room temperature for 24 hours. The foam bun was about 12 inches high. The foam had a density of 1.97 pounds per cubic foot and was composed of 99.7% open cells.

B. A further batch of foam was prepared exactly as in part A above except that 248 parts by weight expandable copolymer beads similar to those employed in Example 1 were mixed with the materials before adding the tolylene diisocyanate thereto. The composite foam was substantially homogeneous. It consisted of 51 volume percent of foamed copolymer beads having a density of 1.54 pounds per cubic foot dispersed throughout the open cell polyurethane foam having a density of 2.67 pounds per cubic foot. A portion of the composite foam 6 inches thick was placed on a concrete pad and tested for its shock cushioning by dropping a 15 pound head-form onto the foam from a height equivalent to a 20 mile per hour impact in an automobile. The foam had a maximum G-value cushioning of 80.

EXAMPLE 3

In each of a series of experiments, a composite foam of an open-cell polyurethane foam matrix having dispersed throughout closed cell foam bodies of a cross-linked copolymer of 99.9 percent by weight of divinylbenzene, 0.05 percent of divinylbenzene, and 0.05 percent by weight of ethylvinylbenzene, was prepared employing procedure and materials similar to that employed in part (B) of Example 2 using cross-linked foamable styrene copolymer beads of sized between 20 and 24 mesh per inch as determined by U.S. Standard screens. Table I identifies the experiments and gives the per cent by weight of the expandable copolymer beads employed, based on the total weight of the materials used. The table also gives the volume of the foamed copolymer bodies expressed as percent by volume of the composite foam volume and the density expressed in pounds per cubic foot of the composite foam, and the density of the foamed copolymer.

TABLE I

| | Percent | | Density (lbs./cu. ft.) | |
|---|---|---|---|---|
| Run No. | Expandable copolymer beads | Volume fraction of copolymer foam | Composite foam | Copolymer foam |
| 1 | 13.2 | 16 | 1.55 | 1.26 |
| 2 | 23.4 | 35 | 1.71 | 1.15 |
| 3 | 37.9 | 45 | 2.21 | 1.18 |

Similar results are obtained when thermally expandable copolymers of from 99.8 to 99.99 percent of styrene and from 0.2 to 0.01 percent of a divinyl aromatic hydrocarbon such as divinyl benzene, divinyltoluene, or divinylxylene are used in place of the copolymer employed in the examples.

We claim:

1. A composite foam suitable for use as a crash padding and cushioning material, which foam comprises from 40 to 90 by volume percent of a flexible open cell polyether polyol urethane foam matrix, prepared by reacting an organic polyisocyanate with a polyether polyol, having dispersed throughout cellular bodies of foamed in situ particles of from 60 to 10 volume percent of a copolymer of from 99.8 to 99.99 weight percent of at least one monovinyl aromatic compound and from 0.2 to 0.01 weight percent of a polyvinyl aromatic hydrocarbon, said copolymer foam having a density of from about 0.5 to 5.0 pound per cubic foot, and said urethane foam having a density between about 0.8 and 3.0 pounds per cubic foot and of at least 80% open or interconnecting pores.

2. A composite foam as claimed in Claim 1 wherein the foamed copolymer is a copolymer of styrene and divinylbenezene.

3. A composite foam as claimed in claim 1 wherein the polyether polyol urethane foam matrix is made from a polyol that is an adduct of an alkylene oxide or mixtures thereof and a polyhydric alcohol having from 3 to 5 carbon atoms and from 3 to 4 OH groups in the molecule.

4. A composite foam as claimed in Claim 1 wherein the polyisocyanate is tolylene diisocyanate.

PO-1050
(5/69)

UNITED STATES PATENT OFFICE
CERTIFICATE OF CORRECTION

Patent No. 3,607,797                         Dated   21 September 1971

Inventor(s)    Louis C. Rubens and Donald H. Clarke

It is certified that error appears in the above-identified patent and that said Letters Patent are hereby corrected as shown below:

In column 1, line 44, change "polyarethane" to -- polyurethane --; in line 73, change "50°" to -- 50% -- and "80°" to -- 80% --.

In column 2, line 4, delete "of", second occurrence, should read -- or --.

In column 3, line 3, delete "bun low" and insert -- bun of low --; in line 4, change "11x11x12.6" to -- 11x17x12.6 --; in line 9, change "60" to -- 60% --; in line 33 delete "11xn" and insert -- 11x17 --.

In column 4, line 48, delete "by".

Signed and sealed this 6th day of June 1972.

(SEAL)
Attest:

EDWARD M. FLETCHER, JR.                ROBERT GOTTSCHALK
Attesting Officer                       Commissioner of Patents